Oct. 28, 1952     W. W. ULMER ET AL     2,615,271
CAST PIGMENTED PLASTIC SHEET
Filed Jan. 30, 1948
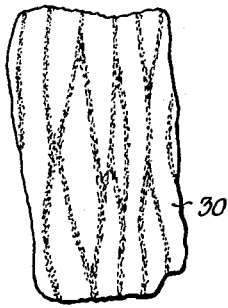
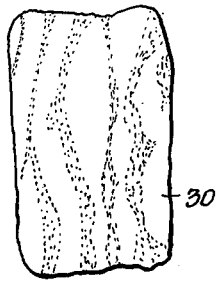
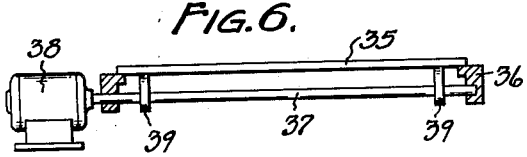
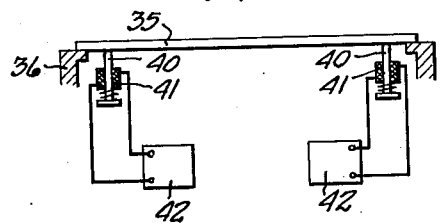
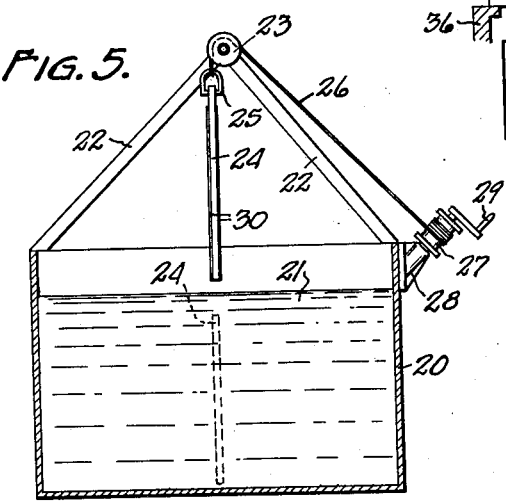
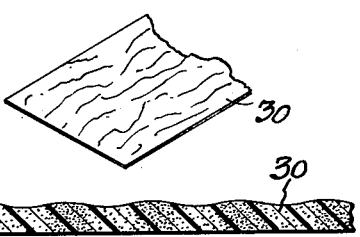
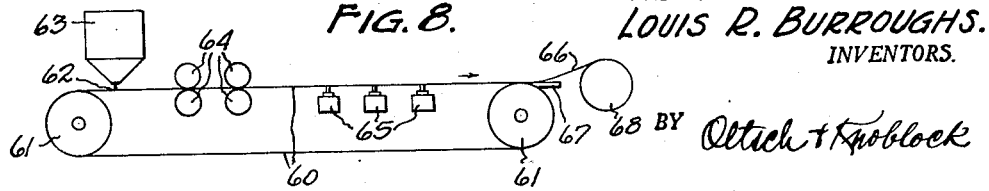
WILLIAM W. ULMER AND
LOUIS R. BURROUGHS.
INVENTORS.
BY Oltsch + Knoblock
ATTORNEYS.

Patented Oct. 28, 1952

2,615,271

UNITED STATES PATENT OFFICE 2,615,271

CAST PIGMENTED PLASTIC SHEET

William Walter Ulmer, Alexandria, and Louis R. Burroughs, South Bend, Ind.; said Burroughs assignor to said Ulmer Application January 30, 1948, Serial No. 5,287

1 Claim. (Cl. 41—24)

This invention relates to improvements in plastic film.

The primary object of the invention is to provide a plastic film, which may be made of different thicknesses, in different patterns, and to possess a wide range of various other properties of physical and decorative character.

A further object is to provide a plastic film having certain characteristic designs which can be selectively provided therein during formation thereof and which impart thereto novel decorative and camouflaging effects.

A further object is to provide a novel method for introducing a design in a plastic film.

Other objects will be apparent from the description, drawings and appended claim.

In the drawings:

Figs. 1 to 3, inclusive, are face views of a fragment of a film having different characteristic designs or patterns.

Fig. 4 is a perspective view of a patterned film.

Fig. 5 is a view of one form of apparatus for producing the plastic film.

Fig. 6 is a view of a different film-forming apparatus.

Fig. 7 is a view of a third type of film-forming apparatus.

Fig. 8 is a diagrammatic view of another type of film-forming apparatus.

Fig. 9 is an enlarged sectional view of a film.

Fig. 10 is an enlarged sectional view of a film illustrating the manner in which pigment is concentrated at the design or pattern-forming areas of the film or sheet.

This application is a continuation in part of our co-pending application, Serial No. 556,462, filed September 29, 1944, now abandoned.

The plastic films to which this invention relates are very thin films possessing waterproof properties and at least a limited degree of elasticity. They may be used for many purposes, some of which are bathing caps, moisture seals for electric instruments, diaphragms for low pressure measuring instruments, shower curtains, packaging or wrapping material, and the like. Preferably they are formed essentially of natural or synthetic materials, such as polyvinyl chloride, polyvinyl chloride-acetate copolymer, cellulose acetate and cellulose nitrate. Films of synthetic rubber formed by dipping, and films of latex formed by dipping, are also contemplated within the scope of the invention. For purposes of simplification, these materials, of some of which there are a number of different types or grades, some differing as to properties, chemical composition and molecular weight, will be referred to herein as synthetic resins. It will be understood, however, that there are many other synthetic resins than those specifically mentioned above from which, by mixture with plasticizers and solvents therefor, and by dipping of a form or spreading on a form, a film may be produced, and therefore the invention will be understood to apply to them as well as the materials named specifically herein. Also the film may constitute a coating of synthetic resin applied to a base, such as a paper, cloth or fibrous sheet and adhered thereto, as by partial or complete impregnation of said sheet by the synthetic resin.

The properties of a film produced from a synthetic resin depend upon the individual character of the specific base material employed, upon the nature and proportion of a plasticizing material used therewith, and upon the nature and amount of the solvent used therewith. These materials must be so mixed that the resulting mixture is uniform throughout and is in the nature of a colloidal suspension. For best results the film-forming material should be stable, i. e. should not be subject to precipitation of solids. Any departure from a uniform stable condition of the film-forming material will result in the production of films therefrom which lack uniformity of thickness and other characteristics and properties desired.

We have discovered that a stable film-forming material can be produced by mixing the synthetic resin, plasticizer and solvent in desired proportions, and cooking the mixture at a temperature just under the boiling point of the solvent for an extended period of time during which the mixture is continuously stirred. One example is to mix 32 gms. of polyvinyl chloride-acetate copolymer in the grades of heaviest molecular weight with 20 gms. of a plasticizer such as dioctyl phthalate or tricresyl phosphate, and with two pounds of a solvent such as methyl ethyl ketone. If such a mixture is cooked at a temperature of from 140° F. to 160° F. for 1½ hours with continuous stirring, a stable colloidal dispersion of the resin and the plasticizer in the solvent is obtained. The film-forming mixture so prepared will stand for long periods of time without noticeable precipitation. Also, stirring of this mixture during the operation of forming a film is substantially or practically avoided. It will be understood, however, that the above preparation and treatment is illustrative, and that the treatment used will vary with the composition and character of the synthetic resin and of the particular plasticizing material and solvent used.

There is a substantial range of the proportions in which the constituent materials may be mixed. The proportions given above are intended for the production of a very thin film. However, the proportions may be varied by either reducing or increasing the amount of the resin employed, reduced amounts of resin used resulting in thinner films and use of increased amounts thereof producing a thicker film.

The film may be made with apparatus of the type illustrated in Fig. 5. A container 20 open at its upper end contains a quantity or bath 21 of the synthetic resin film-forming liquid described above or any other liquid material from which a film of the type mentioned above may be formed. A frame 22 extends above the top of container 20 and journals a pulley 23. A plate 24, preferably formed of glass or other material having a very smooth surface, may be supported in vertical position by a bracket or clamp suspended from a cable 26 or the like trained around the pulley 23. Suitable means, here illustrated as a drum 27 journaled in a bracket 28 and operated by a crank 30, are provided to play out and pull upon the cable to lower the plate 24 into the bath and withdraw it from the bath. It may be mentioned also that if the plate 24 is formed of metal, it should be chrome or nickel plated to prevent chemical reaction with the bath 21. Plate 24 may also be made of aluminum if the same is provided with a highly polished surface.

The operation of forming the film with the apparatus described above is accomplished by lowering the plate 24 into the bath 21 and then withdrawing said plate at a uniform speed. Control of the speed of withdrawal of the plate is critical to both uniformity of the film produced and the thickness thereof. Thus, if a mixture prepared in the manner and of the proportions described above is withdrawn very slowly, at a rate not faster than the rate at which the mixture will flow, for example at a rate of about 4½ inches per minute, a film 30 of minimum thickness, i. e. in the order of a thickness of .004 inch will be produced upon the surfaces of plate 24. Withdrawal of plate 24 from the same solution at a faster rate will produce a thinner film 30 upon plate 24, for example, withdrawal at the rate of about 36 inches per minute producing a film in the order of .0012 thickness. For any given mixture there will be a minimum and a maximum film thickness obtainable. Thicknesses between these limits can be obtained by proper timing of the rate of withdrawal. Therefore, two factors control film thickness, i. e., the consistency of the bath and the rate of form withdrawal. Hence it is possible to produce a film of any of a wide range of thicknesses and a wide range of properties, such as elongation, resilience and the like. The film can be stripped from the form easily, since it has only a frictional adhesion therewith, and its elasticity and flexibility assist in the operation of peeling it from the form. The thinness of the film facilitates the drying action.

The temperature at which the bath is maintained is not critical with the polyvinyl chloride-acetate copolymer mentioned above, and satisfactory results can be obtained, without detrimental effect upon the properties of the bath, if the same is maintained at any temperature which is below the boiling point of the solvent and above the solidifying point of the mixture. Thus the operation can be conducted to produce a satisfactory film at temperatures as low as −20° C. and as high as 79° C., with the mixture described above. Temperatures in the upper part of this range are naturally preferred. The temperatures employed with other of the synthetic resin materials will depend upon the properties thereof and of the plasticizer and solvents used therewith, as is well understood in the art.

The film produced by the above method will be of uniform thickness and clear and transparent, if the constituent materials are not pigmented. Colors can be incorporated as desired, as by using pigmented synthetic resin. Different degrees of opacity can be obtained by incorporating talcum powder, talc, flour or like materials in colloidal suspension in the film-forming bath. The film may posses other properties, such as flexibility, elasticity, uniformity, water-proofness or moisture resistance, depending upon the synthetic resin employed.

The method of forming the film may be altered from that described above to one wherein the mixture is poured upon a horizontal form and then leveled and its thickness regulated by the use of a scraper, after which the film is permitted to set and dry. The latter method may be practiced by either of the types of apparatus shown in Figs. 6 and 7, wherein the horizontal forming plate is illustrated at 35, and also may be practiced by forming a film on a web or belt in a continuous process, as shown in Fig. 8. The advantage of these methods lies principally in their adaptation to the provision of design patterns in the film being formed. Thus, referring to Fig. 6, the plate 35 is mounted on a suitable horizontal support 36 in which is journaled a shaft 37 driven by an electric motor 38. Cams 39 may be mounted on shaft 37 of such size and shape that they engage and vibrate the plate 35 at a predetermined or selected period. While one shaft 37 mounting two cams 39 has been illustrated, it will be understood that a plurality of cam shafts may be employed, operating at the same or different speeds depending on the design pattern desired, that each shaft may mount one or any selected number of cams, and that the cams may be of the same contour or different contours depending upon the design pattern desired. In the apparatus shown in Fig. 7, the plate 35 rests upon support 36 and is engaged by the spring pressed armatures 40 of solenoids 41 or other electrical apparatus such as a magnetic vibrator of the type used in loud speakers. While two solenoid armatures are shown, one, or more than two, may be used if desired. The units 41 may be controlled for vibration thereof or of the armature thereof at high frequency by a conventional audio oscillator 42 which is preferably of the type whose frequency can be regulated.

In the apparatus shown in Fig. 8, an endless web or belt 60 of any suitable material is trained around rollers 61, one of which is preferably power driven. The upper run of the belt has the fluid synthetic resin applied thereto at 62, as by flowing the same thereon from a container 63. The resin coating is smoothed and its thickness regulated by suitable means such as rollers 64, 65. Thereafter the belt is acted upon by one or more vibrators 65 while it is solidifying and setting. The completed film 66 is separated from the belt, as by scraper 67, after it has dried or set, and is then rolled at 68, or otherwise handled.

When a film is formed on any of the devices shown in Figs. 6, 7 and 8, or on a device such as shown in Fig. 5 which is provided with suitable means (not shown) for vibrating the plate 24 as it is withdrawn from bath 21, or on any other suitable apparatus provided with vibrating means, certain properties of the film result. The film assumes a definite patterned or design appearance as the result of the vibration. Characteristic design patterns are illustrated in Figs. 1, 2, 3 and 4. It will be understood, of course, that the designs illustrated in said Figs. 1 to 4 are illustrative only and not limiting, since the number of designs and the character thereof is almost infinite. There is, for example, a definite relation between the nature of the design pattern and the amplitude and period of vibration. Also, the mixture employed in the film-forming bath determines design characteristics. Where pigmented materials are employed, the design is quite pronounced, and is characterized by areas of darker and lighter shades of the same color, as illustrated in Fig. 10 where the spacing of the dots is indicative of the concentration of the pigment. In exceedingly thin films or any film which is translucent and normally transparent, these properties are retained in the designed or patterned film, but the design breaks the continuity of an image viewed therethrough by an effect upon the eye which can be likened to that of camouflaging. These properties, therefore, offer substantial possibilities in decorative and other uses. The vibration preferably occurs as the film is being dried, and in most cases entails a certain degree of thickening of the film at the pattern-forming lines or areas. This is not noticeable in thin films which have been vibrated at high frequency, but increases as film thickness and amplitude of vibration increase and as the frequency of vibration decreases.

The process of forming a design upon synthetic resin film is not limited to performance at the time when the film is being formed. Thus a preformed film may be treated to impart a design thereto. Such treatment entails softening at least the surface portion of the preformed film to render the same fully or partially fluid, as by applying a solvent thereto or by the combined action of heat and a solvent. When the film or film surface has been softened or rendered fluid to a degree to permit it to be reworked or reshaped, it can be subjected to vibration by any suitable means during the time the solvent is evaporating and the film is setting to self-sustaining condition, i. e., until its shape or form can no longer be varied or until it will retain its shape or contour unless forcibly reshaped. In this connection, films of the type known in the art as dipped films or cast or molded films can be readily worked by this method. Some other types of films, and particularly those known in the art as calendered films, present greater difficulties to and are less well adapted for practice of this method thereon after the same have once been formed.

The time at which and during which vibration is applied in the process of forming a film, as shown in Figs. 5, 6, 7 and 8, is governed by the same considerations mentioned above. In other words vibration must commence while the film contains some of the solvent and possesses at least a measure of free fluidity and must continue until enough of the solvent is evaporated so that such fluidity ceases and the film becomes self-sustaining or shape-retaining, and preferably until it is no longer workable or until it can only be worked by application of substantial forming pressure thereto.

Vibration within a wide range of frequencies may be applied to produce a design pattern as described above. The range of frequencies effective to produce a design varies from a low limit of approximately 200 cycles per second to a high limit of approximately 30,000 cycles per second. The pattern produced varies with the frequency, and Fig. 3 is illustrative of a coarse pattern produced at low frequencies; Fig. 2 is illustrative of a fine pattern produced at high frequencies; and Fig. 1 is comparatively illustrative of a pattern produced at an intermediate frequency. The pattern will vary somewhat with the thickness of the film, particularly where the amplitude of vibration at a given frequency remains constant when applied to films of the same material but of different thickness. In general, however, if amplitude of vibration is increased proportionally to increases in film thickness, the change of design for a given frequency upon films of the same material but of different thicknesses will be small. The thickness of the film may vary from approximately .002 inch to approximately .012 inch. Films of thicknesses greater than the latter limit do not offer a satisfactory basis for the practice of the method under all conditions, although they are not completely devoid of properties permitting practice of the method. Also, films at or near the upper limit of thickness generally are less susceptible of designing at frequencies at or near the upper end of the frequency range specified than thinner films. The greatest variation of design pattern occurs at the lower frequencies; thus at frequencies exceeding 16,000 cycles per second, very large differences in frequency are required to produce substantial or appreciable differences in design.

As mentioned above, the vibration method may be practiced upon sheet material coated with a thin film of the synthetic resin. The sheet material may be paper, cloth or other fibrous sheet material to which the synthetic resin adheres or which is partly or completely impregnated or saturated by the synthetic resin. Such material may be vibrated in any manner suitable, and in cases where the coating thickness is within the range specified and the vibration applied is within the range specified, and is of sufficient amplitude and duration, the production of a design will result.

The vibrated film, in addition to its design, will also be characterized by a rippled surface at the face thereof opposite that which bears against the form or support, as best seen in Fig. 9, or at the coating surface or coated sheet material. This can readily be detected in the coarse patterns, especially where the amplitude of vibration has been substantial, and becomes less noticeable as the pattern becomes finer. Such ripples obviously entail the formation of surface ridges and depressions, and therefore the thickness of the film varies from point to point, although the differences will usually be very small and will not appreciably reduce the strength of the film or be otherwise detrimental.

Synthetic resins of the types described above may be plasticized by other materials than those mentioned above. The proportions in which such other plasticizers are used will depend upon the synthetic resin with which they are used, as is well understood in the art, and different plasticizers may be found to be preferable to secure different characteristics which it is desired to obtain in films made for different uses and purposes. Different solvents from that specifically mentioned above may also be used. The proportions in which different solvents are incorporated will depend essentially upon the molecular weight or specific gravity of each solvent and on the synthetic resin and plasticizer with which each is used. In general, as the specific gravity of solvents increases, an increase of the amount of solvent proportional to the percentage of increase in the specific gravity must be supplied.

Synthetic resins of the type described above may also be mixed with other resins and synthetics. The test of the materials so usable appears to be whether or not such materials are compatible with the synthetic resins. Tests made adding to polyvinyl chloride-acetate copolymer a different synthetic resin, such as methyl methacrylate, and to synthetic rubber materials as "Buna S" and "Hycar" show that they are compatible. The materials listed will be understood to be illustrative and not to be complete. The properties of the film differ according to such other materials added to and forming part of the film-forming bath, among which may be mentioned drying characteristics and different degrees of elasticity. Hence, for a given use, where certain properties are essential, the film-forming bath may be formulated by variation of the illustrative formula given above to provide such properties in the film. Also, it has been found that the design patterns resulting from vibration differ with the different synthetics incorporated in the film-forming liquid. In other words, a material containing methyl methacrylate and polyvinyl chloride-acetate copolymer, when processed to a given film thickness and vibrated at a given frequency, will have a different design pattern than a material containing polyvinyl chloride-acetate copolymer only when processed to the same thickness and vibrated at the same frequency.

In the manufacture of films in the manner described above, the film does not become stable until it has been dried thoroughly; that is, until the volatile constituents of the film-forming material have been evaporated or expelled. The film is subject to shrinkage and has an odor characteristic of the solvents, until it becomes stable. In the thin sections of the order to which reference has been made, complete drying can be accomplished by simply exposing it to atmosphere. However, complete elimination or evaporation of volatile constituents by air drying is slow. Therefore, it is preferable for practical considerations to pass the film through a heated chamber or otherwise subject it to heat to accelerate expulsion of volatile constituents in most cases.

We claim:

A cast synthetic resin sheet of substantially uniform thickness and continuous integral structure, said sheet being pigmented throughout and being characterized by greater density of said pigment at some parts thereof than at others to define a design pattern, one surface of said sheet being rippled with the ripples thereof coinciding with the parts of greatest pigment density.

WILLIAM WALTER ULMER.
LOUIS R. BURROUGHS.

REFERENCES CITED

The following references are of record in the file of this patent:

UNITED STATES PATENTS

| Number | Name | Date |
|---|---|---|
| 596,942 | McGowan | Jan. 4, 1898 |
| 1,806,863 | Paissean | May 26, 1931 |
| 1,886,972 | Payne | Nov. 8, 1932 |
| 1,950,417 | Root | Mar. 13, 1934 |
| 2,238,730 | Hauffe | Apr. 15, 1941 |
| 2,304,632 | Faelten | Dec. 8, 1942 |
| 2,360,650 | Crane | Oct. 17, 1944 |
| 2,371,868 | Berg | Mar. 20, 1945 |
| 2,440,039 | Brown | Apr. 20, 1948 |
| 2,480,749 | Marks | Aug. 30, 1949 |

FOREIGN PATENTS

| Number | Country | Date |
|---|---|---|
| 711,683 | Great Britain | Sept. 15, 1931 |